United States Patent [19]

Brue et al.

[11] Patent Number: 5,033,708
[45] Date of Patent: Jul. 23, 1991

[54] BIRD BELL SUPPORT

[75] Inventors: Randal N. Brue, Menasha; Timothy J. Bauer, Madison; Robert LaMasney, Black Earth, all of Wis.

[73] Assignee: Kaytee Products, Inc., Chilton, Wis.

[21] Appl. No.: 230,792

[22] Filed: Aug. 10, 1988

[51] Int. Cl.⁵ .............................................. A01K 5/00
[52] U.S. Cl. .................. 248/309.2; 248/686; 248/317; 119/57.8
[58] Field of Search ............ 248/309.2, 317, 304, 248/308, 300, 301, 360, 324, 359 D, 359 R, DIG. 9; D30/124, 128; 223/87, 89; 119/51 R, 18, 26, 57.8

[56] References Cited

U.S. PATENT DOCUMENTS

| D. 207,781 | 5/1967 | Lowe | D30/124 |
| 1,810,836 | 6/1931 | Laubenstein | 248/300 X |
| 2,783,155 | 2/1957 | Haug | 248/317 X |
| 4,350,260 | 9/1982 | Prueher | 220/268 X |
| 4,602,757 | 7/1985 | Signorelli | 248/309.2 X |

FOREIGN PATENT DOCUMENTS 2806391  8/1978  Fed. Rep. of Germany ...... 248/359
3320833  12/1984  Fed. Rep. of Germany .... 119/51 R
799716  7/1957  United Kingdom .................. 119/18

OTHER PUBLICATIONS

Photographs of Two-Piece Bird Bell Support.

Primary Examiner—Karen J. Chotkowski
Attorney, Agent, or Firm—Foley & Lardner

[57] ABSTRACT

A unitary bird bell support formed of plastic material includes a substantially planar disk including a top surface on which the bell rests, and a hanging tab integrally hinged to the disk at a hinge line which is located substantially at a center of the disk. A portion of the hanging tab is cut from the disk to form a radial slot which extends from the peripheral edge of the disk to the inner margin of the slot which forms the hinge line between the disk and hanging tab. The hanging tab is movable between an unfolded position in which the hanging tab is substantially coplanar with the disk and includes a portion which is positioned within the slot, and a folded position in which the hanging tab is substantially normal to the disk, extending upwardly and being positionable within an axial slot within the bird bell. The top portion of the hanging tab should extend upwardly out from the axial slot and has an aperture by which the support and bird bell may be hung.

5 Claims, 2 Drawing Sheets

BIRD BELL SUPPORT

FIELD OF THE INVENTION

The present invention relates to the field of bird feeders, and particularly to structures which can be utilized to hang wild bird bells formed from bird seed.

DESCRIPTION OF THE PRIOR ART

Bird bells which are formed from a combination of the seeds such as white millet, sunflower, red millet, milo, and which are held together by a dried sticky material such as honey or dextrose, are commonly used to feed and attract wild bird species. Bird bells present a particularly difficult problem to support properly, in that they are loosely "glued" together since they are designed to feed birds. Often, form-fitting net-type sacks have been utilized for hanging the bells.

Another type of bird bell support has been made which includes a disk for supporting the bottom of a bird bell, and a separate hanging tab which must be connected to the disk and inserted into an axial slot within the bird bell so that a top portion of the tab extends out above the bird bell. The hanging tab includes an aperture by which the bell support and bird bell may be hung. Centrally located in the disk is a slot into which a widened lower end of the hanging tab may be inserted and twisted to thereby connect to the disk. It has been found, however, that this two-piece construction can be comparatively expensive. Additionally, it is possible for the hanging tab and disk to become separated if they rotate with respect to each other, thereby allowing the bird bell to fall.

SUMMARY OF THE INVENTION

The present invention is a single piece bird bell support formed of plastic material which may be economically manufactured. The bird bell support includes a substantially planar disk with a top surface on which the bird seed bell rests, and a hanging tab which is integrally hinged to the disk at a center of the disk. The hanging tab and disk are formed as a single piece structure. Formation of the hanging tab is completed by cutting a radial slot in the disk extending from the peripheral edge of the disk adjacent to the tab to an inner margin of the slot which is located substantially at a center of the disk and which also forms the hinge line between the hanging tab and disk. The hanging tab is movable between an unfolded position in which the hanging tab is substantially coplanar with the disk and includes a portion which is positioned within the slot, and a folded position in which the hanging tab is substantially normal to the disk, extending upwardly so as to be positionable within an axial slot within the bell. The hanging tab is inserted upwardly within the axial slot so that a top portion of the hanging tab extends upwardly out of the axial slot. The top portion of the hanging tab has an aperture by which the support and bird bell may be hung.

The disk preferably forms a groove into which a stick such as a "Popsicle" stick may be inserted so as to extend outwardly beyond the peripheral edge of the disk to form a perch for the birds eating the seed. The disk preferably includes ridges which strengthen the disk so that it provides improved support to the bird bell.

Further objects, features, and advantages of the invention will be apparent from the following detailed description when taken in conjunction with the accompanying drawings.

DESCRIPTION OF THE PREFERRED EMBODIMENT

Figure 1:
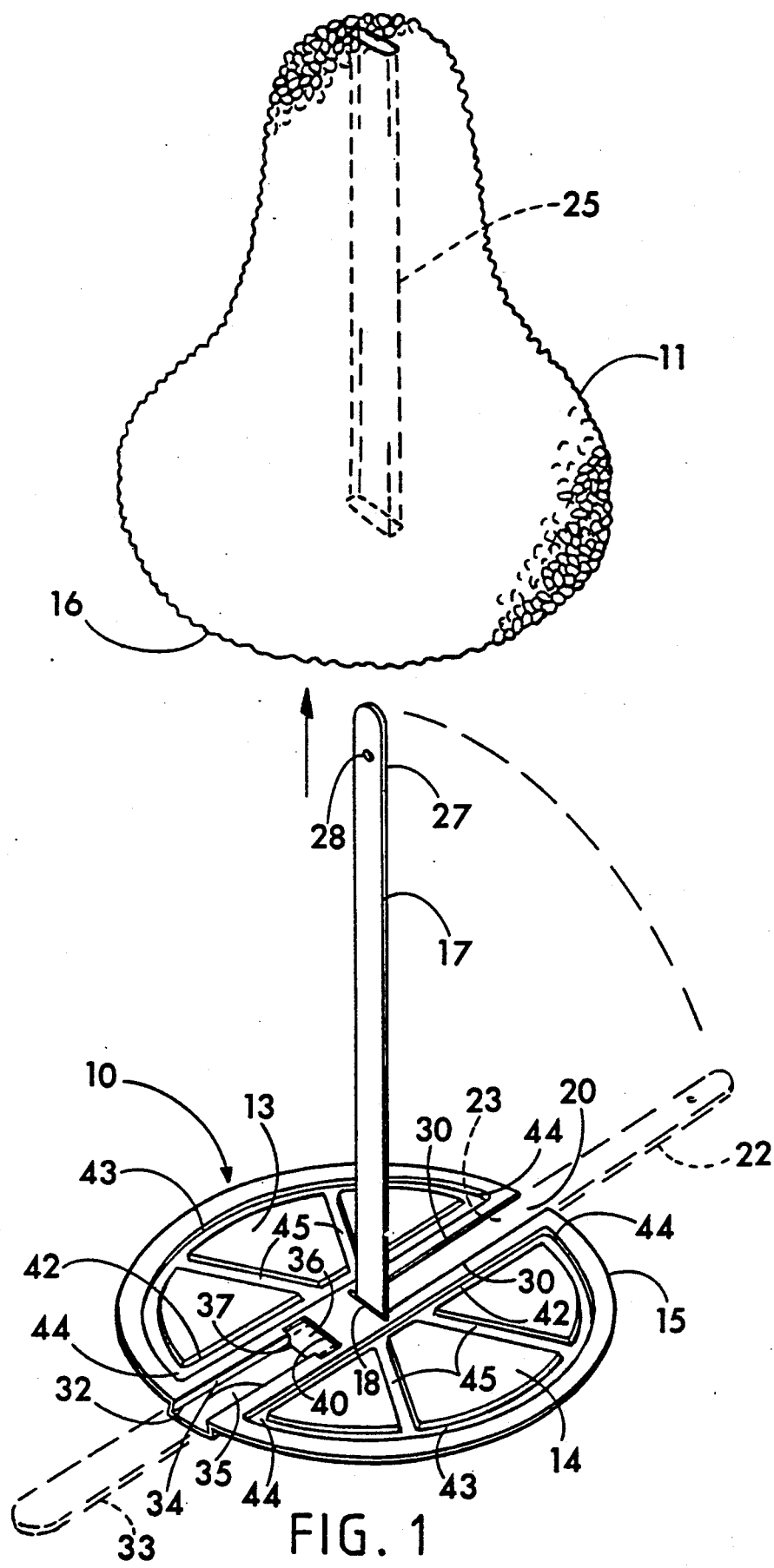
FIG. 1 is a perspective view of the bird bell support, with a wild bird bell projected above the support.
Figure 2:
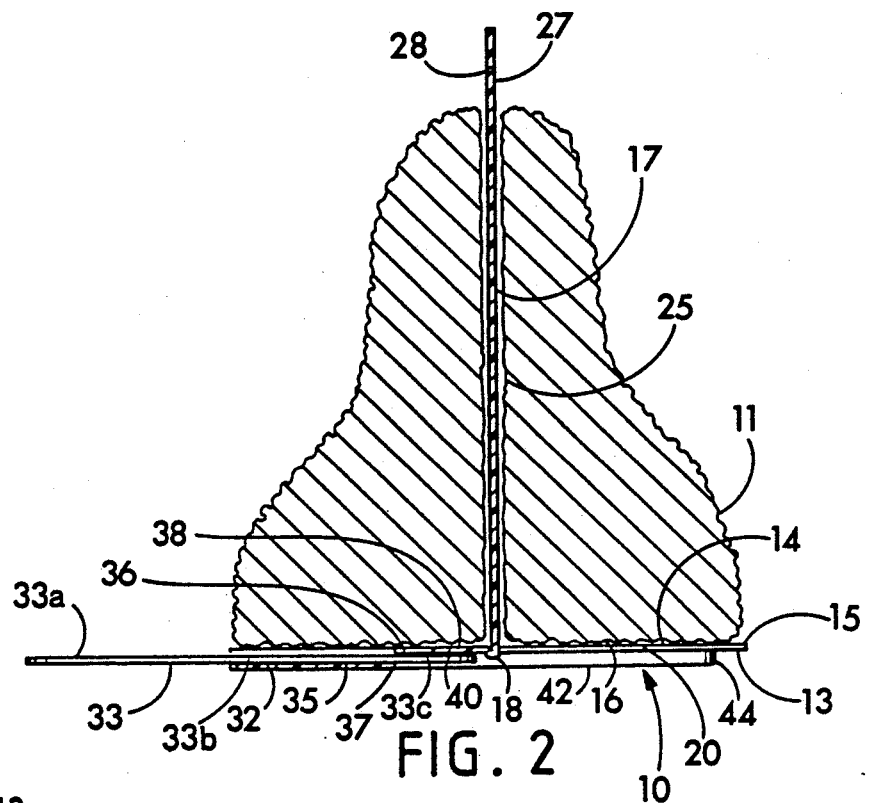
FIG. 2 is a cross-sectional view of the bird bell support and a bird bell being supported by the support.

With reference to the drawings, a bird bell support 10 is shown in perspective view in FIG. 1, with a wild bird bell 11 formed of conglomerated bird seed projected axially above the support 10. FIG. 2 shows the bird bell support 10 and bird bell 11 together in cross-sectional view. The bird bell support 10 is formed from thin, flexible plastic material and includes a substantially circular planar disk 13 with a top surface 14, on which the bottom 16 of the bell 11 rests, a peripheral edge 15, and a hanging tab 17 which is integrally hinged to the disk by the hinge line 18 at the center of the disk 13.

The planar disk 13 has a radial slot 20 of selected width which extends from the peripheral edge 15 to an inner margin 18 of the slot 20 substantially at the center of the disk 13 where the hinge line 18 is located. The hanging tab 17 is movable between an unfolded position, which is shown in dashed lines at 22 in FIG. 1 and in solid lines at 17 in FIG. 3, in which the hanging tab 17 is substantially coplanar with the disk 13, and a folded position shown at 17 in FIGS. 1 and 2. As shown most clearly in FIG. 3, the hanging tab 17 in its unfolded position includes a portion 23 which is positioned within the slot 20 so that the sides of that portion 23 are substantially coincident with the sides of the slot 20 at 30. Before being cut, the sides of this hanging tab portion 23 and the sides of the slot 20 were connected.

In the folded position, the hanging tab 17 is substantially normal to the disk 13, and extends upwardly so as to be positionable within an axial slot 25 in the bird bell 11 as shown by the arrow in FIG. 1 and in cross-sectional view in FIG. 2. As shown in FIG. 2, the hanging tab 17 is of greater length than the axial slot 25 in the bell 11 so that a top portion 27 of the hanging tab 17 extends upwardly outside of the slot 25. The top portion 27 has an aperture 28 through which the support 10 and bird bell 11 may be hung.

Figure 3:
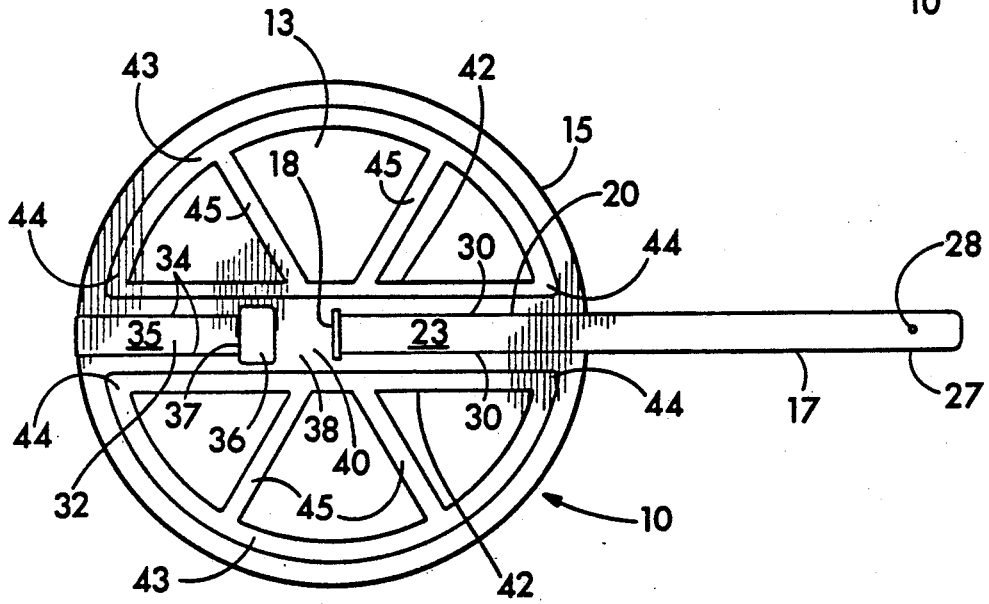
FIG. 3 is a bottom view of the bird bell support, with the hanging tab in its unfolded position.

As shown in FIG. 3, the entire disk 13 and hanging tab 17 may be formed as a single sheet of plastic through thermoforming, molding or by other techniques. The hanging tab 17 and disk 13 then may be cut at 30 to form the radial slot 20 and to separate the hanging tab 17 from the disk 13, except along the hinge line 18. The hanging tab 17 is then hinged to the disk 13 at the inner margin 18 of the slot 20. Preferably, the hinge line 18 is formed as a continuation of the material forming the inner margin 18 and the hanging tab 17.

Figure 4:
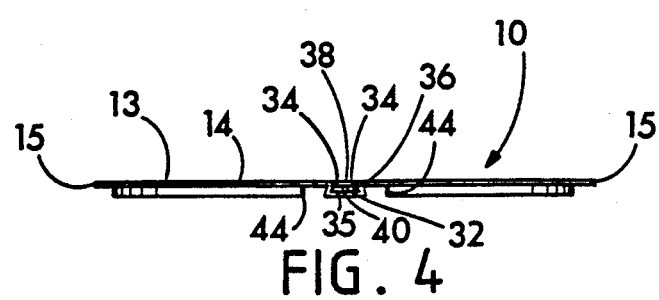
FIG. 4 is a side elevational view of the bird bell support, taken from a side on which the radial groove opens.

The disk preferably is crimped or formed to have a radial groove 32 of select depth and width. The groove 32 extends from the peripheral edge 15 of the disk 13 partially toward the disk center 18. A stick 33 of select depth and width, such as a Popsicle stick, may be inserted into the groove 32 to form a bird perch 33a as shown in dashed lines in FIG. 1 and solid lines in FIG. 2. The depth and width of the stick 33 should be substantially the same as the depth and width of the groove 32 so that the stick 33 fits tightly within the groove 32. As shown in FIG. 4, the disk 13 preferably includes two side walls 34 of the groove 32 which are inclined from a floor 35 of the groove 32 toward a center line of the groove 32 so that the side walls 34 abut and impinge against a stick 33 which is of the select depth and width and which is placed within the groove 32.

As shown in FIG. 3, the disk 13 preferably has an opening 36 therethrough located at an inner end 37 of the groove 32, and which is displaced radially outwardly from the disk center 18 so that a bridge portion 38 of the disk 13 is located between the opening 36 and the disk center 18. As shown in FIG. 4, the bridge portion 38 is parallel to the floor 35 of the groove 32 and is spaced perpendicularly therefrom by the select depth. Therefore, a stick 33 of select depth and width placed within the groove 32 can be inserted to extend radially inwardly through the opening 36 to abut against a bearing surface at 40 on the bottom of the bridge portion 38 which faces in a direction opposite to that direction which the groove floor 35 faces. As shown in FIG. 2, a perch stick 33 placed properly into the groove 32 passes over the floor 35 of the groove 32 and under the bridge portion 38. Thus, when a bird alights upon the perch portion 33a of the stick 33, which extends out beyond the disk peripheral edge 15, the bearing surface 40 pushes downwardly on the inward portion 33c of the stick 33 to prevent the stick 33 from popping out of the groove 32. Additionally, the groove portion 33b of the stick 33 which is located within the groove 32 lies between the groove floor 35 and the bottom 16 of the bell 11.

As shown in FIGS. 1–4, the disk 13 is crimped or formed to include two section line ridges 42 which are parallel to and spaced outwardly from the diametrically colinear slot 20 and radial groove 32. Each section line ridge 42 extends substantially across the entire disk 13 almost to its peripheral edge 15. The disk 13 also includes two arc shaped ridges 43 which each connect to and extend circularly from one end 44 of a section line ridge 42 to the other end 44 of the section line ridge 42. Extending radially between each arc shaped ridge 43 and connected section line ridge 42 are two ridge portions 45 as shown in FIGS. 1 and 3. The ridges 42, 43 and 45 strengthen the disk 13 so that it can bear more weight.

In use, the bird bell support 10 is utilized to hang a molded wild bird seed bell 11. The disk 13 and hanging tab 17 should be cut at 30 to separate the hanging tab 17 from the disk 13 and to form the radial slot 20. The hanging tab 17 may then be folded upwardly to its perpendicular position as shown in FIG. 1. The perch stick 33 may be inserted into the groove 32 so that the inward portion 33c of the stick 33 is positioned under the bearing surface 40 and the outer end of the stick 33 forms a perch 33a which extends outwardly beyond the peripheral edge 15 of the disk 13. The hanging tab 17 is then simply inserted into the axial slot 25 of the bird bell 11 so that a top portion 27 of the hanging tab 17 extends out from the top of the axial slot 25. The substantially planar disk 13 then bears the weight of the bird bell 11 when the bird bell support 10 is hung by placing a hook or other hanging device through the aperture 28.

It is understood that the invention is not confined to the particular construction and arrangement herein illustrated and described, but embraces such modified forms thereof as come within the scope of the following claims.

What is claimed is:

1. A unitary bird bell support formed of plastic material, comprising:
   (a) a substantially planar disk including a top surface on which the bell rests and a peripheral edge, the disk having a radial slot extending from the peripheral edge to an inner margin of the slot which is located substantially at a center of the disk, wherein the disk is formed to have a radial groove of select depth and width, the groove extending from the peripheral edge partially toward the disk center, the select depth and width being equal to the depth and width of a stick which can be placed within the groove to extend radially outwardly beyond the disk peripheral edge to form a bird perch, and wherein the disk forms an opening through the disk located at an inner end of the groove and displaced radially outwardly from the disk center so that the disk includes a bridge portion which is located between the opening and disk center, the bridge portion being parallel to a floor of the groove and perpendicularly spaced therefrom by the select depth, so that the stick placed within the groove can extend radially inwardly through the opening to abut against a bearing surface on the bridge portion which faces in a direction opposite to that which the groove floor faces; and
   (b) a hanging tab integrally hinged to the disk at a hinge line at the inner margin of the slot, the hanging tab being movable between an unfolded position in which the hanging tab is substantially coplanar with the disk and includes a portion which is positioned within the slot, and a folded position in which the hanging tab is substantially normal to the disk, extending upwardly to be positionable within an axial slot within the bell.

2. The bird feeder of claim 3 wherein the groove opens upwardly toward the bird bell so that a portion of the stick which is placed within the groove lies between the groove floor and a bottom of the bell.

3. A bird feeder comprising:
   (a) a substantially planar disk including a top surface and a peripheral edge, the disk having a radial slot extending from the peripheral edge to an inner margin of the slot which is located substantially at a center of the disk; wherein the disk is formed to have a radial groove of select depth and width, the groove extending from the peripheral edge partially toward the disk center, the select depth and width being equal to the depth and width of a stick which can be placed within the groove to extend radially outwardly beyond the disk peripheral edge to form a bird perch;
   (b) a hanging tab integrally hinged to the disk at a hinge line at the inner margin of the slot, the hanging tab being folded to a position in which the hanging tab is substantially normal to the disk; and
   (c) a bird bell having an axial slot that is positioned on the top surface of the substantially planar disk so that the hanging tab extends upwardly through the axial slot of the bird bell and extends outside of the slot, the bird bell formed to include bird seed.

4. A unitary bird bell support formed of plastic material, comprising:

(a) a substantially planar disk including a top surface on which a bell rests and a peripheral edge, the disk having a radial slot extending from the peripheral edge to an inner margin of the slot which is located substantially at a center of the disk, wherein the disk is formed to have a radial groove of select depth and width, the groove extending from the peripheral edge partially toward the disk center, the select depth and width being equal to the depth and width of a stick which can be placed within the groove to extend radially outwardly beyond the disk peripheral edge to form a bird perch, and wherein the stick is placed within the groove and extends radially outwardly beyond the disk peripheral edge to form a bird perch;

(b) a hanging tab integrally hinged to the disk at a hinge line at the inner margin of the slot, the hanging tab being movable between an unfolded position in which the hanging tab is substantially coplanar with the disk and includes a portion which is positioned within the slot, and a folded position in which the hanging tab is substantially normal to the disk, extending upwardly to be positionable within an axial slot within the bell.

5. A unitary bird bell support formed of plastic material, comprising:

(a) a substantially planar disk including a top surface on which the bell rests and a peripheral edge, the disk having a radial slot extending from the peripheral edge to an inner margin of the slot which is located substantially at a center of the disk, wherein the disk is formed to have a radial groove of select depth and width, the groove extending from the peripheral edge partially toward the disk center, the select depth and width being equal to the depth and width of a stick which can be placed within the groove to extend radially outwardly beyond the disk peripheral edge to form a bird perch, and wherein the disk includes two inclined sidewalls of the groove which are inclined from a floor of the groove toward a centerline of the groove so that the sidewalls abut and impinge against a stick of the select depth ad width placed within the groove; and (b) a hanging tab integrally hinged to the disk at a hinge line at the inner margin of the slot, the hanging tab being movable between an unfolded position in which the hanging tab is substantially coplanar with the disk and includes a portion which is positioned within the slot, and a folded position in which the hanging tab is substantially normal to the disk, extending upwardly to be positionable within an axial slot within the bell.

* * * * *